Patented May 3, 1927.

1,626,942

UNITED STATES PATENT OFFICE.

WILLIAM J. LIIPFERT, OF TIMONIUM, MARYLAND, ASSIGNOR TO GENERAL CHEMICAL COMPANY, OF NEW YORK, N. Y., A CORPORATION OF NEW YORK.

CALCIUM ARSENATE PRODUCTS AND PROCESS OF MAKING THE SAME.

No Drawing. Application filed February 6, 1924. Serial No. 691,025.

My invention relates to calcium arsenate products and has for its object to produce a substance of substantially uniform character and of great efficiency in the extermination of insect pests such as the boll weevil. The use of calcium arsenate for such purposes is well known but its effectiveness has been rather uncertain, chiefly for the reason that the processes employed heretofore did not yield a product of uniform characteristics and efficiency. It was found that calcium arsenate differed in appearance and efficiency very widely, not only as regards the products of different manufacturers, but even in different batches of the product obtained from the same maker. Investigation showed that calcium arsenate as produced is generally of a crystalline character and that its properties varied with the size of the crystals, being, generally speaking, more satisfactory in the case of small crystals than when the crystals were comparatively large. Investigation also disclosed an exceedingly objectionable variation in the amount of soluble arsenic present in the products of different manufacturers as well as in different batches of the same manufacturer. The problem therefore consisted in finding a way of producing calcium arsenate having very small particles of as uniform a size and constitution as possible.

According to the present invention, the desired results are obtained by causing the calcuim arsenate to be precipitated at comparatively low temperatures and subsequently subjecting the material to a treatment which converts the precipitate to a mass of small uniform individual particles.

A particular illustrative example of the invention is as follows: Water from any suitable supply and at a temperature of from 32° F. to about 75° F. depending on atmospheric temperature, but in any case below 100° F., is run into a vessel containing a suitable stirring device. Hydrated lime is then added, the amounts of water and of hydrated lime being such as to yield a suspension containing from 5 to 15% of CaO by weight. The concentration of the hydrated lime may be varied within comparatively wide limits; the lower concentrations are more favorable to securing a final product of the desired quality while higher concentrations are more favorable to a shortening of the time required for the completion of the process. While the agitator is kept running, a solution of arsenic acid (of any convenient concentration) in an amount calculated to give the final dried product the desired percentage of $As_2O_5$ (for instance, 40% $As_2O_5$) is run into the vessel containing the suspension of hydrated lime. A precipitate of calcium arsenate in the form of irregular crystals will occur at once, the crystals varying in form and composition with respect to their arsenic content. The reaction produces a considerable amount of heat and the rate of addition of the arsenic acid solution is determined by the effect of the heat of reaction upon the temperature of the batch, the best results being obtained if the maximum temperature reached at any time during the reaction between the arsenic acid and the lime suspension be kept below 100° F. This entire precipitation treatment therefore takes place in the cold, that is to say, at the normal temperature of the air. Particular care must be taken in the summer time, where, if city water is used, its temperature will often approach 75° F. and the danger of reaching or exceeding 100° F. by the heat due to the reaction is increased. In order to keep the temperature below 100° F. under the relatively unfavorable summer conditions, I may either increase the dilution of hydrated lime slurry as compared with the dilution employed in the winter when the water is colder, or proceed by adding the arsenic acid very slowly, or by adding a certain portion, for instance, three-fourths of the necessary arsenic acid, and then waiting fifteen or twenty minutes before adding the balance.

In any event, if the temperature has been kept sufficiently low, a peculiar action will occur shortly after the completion of the mixing. The action which I will refer to as "swelling" may begin immediately without agitation if the concentration of the precipitate with respect to the liquid matter is high. Usually, however, with ordinary concentrations it commences in a few minutes with or without agitation but with low concentrations may require an hour or more and constant stirring. In the illustrative example, when the original concentration of the lime suspension is about 10–15% by weight of CaO, the swelling occurs after a few minutes, i. e., 10–15 minutes. This swelling phenomenon converts the thin mixture of precipitate and liquid into the nature of a paste, the action being apparently one of hydration. The pasty mass when examined under the microscope appears to consist of more or less uniform crystals. The mass continues to thicken and to prevent it from becoming excessively stiff water may be added preferably with continuous agitation of the mix until a point is reached where the water is no longer taken up by the precipitate and subsequent addition would thin out the mixture. This point may be termed the "limit of saturation". When water has been added to this extent, the calcium arsenate has approached its maximum distribution or spread and has reached the point of greatest crystalline uniformity, the crystals being needle-like in form.

I now boil the resulting product and thereby drive out the water of crystallization or a part of it. This treatment causes the long needle-like crystals to break up and assume the form of minute substantially uniform rounded particles. After the boiling the mixture is conveyed to driers in order to convert it into the desired commercial product.

Where filtration is contemplated before sending the product to the driers the addition of water during the swelling stage may be carried to the point of saturation without any great inconvenience or cost, but where it is desired to dry the mix after boiling without preliminary mechanical reduction of its water content, it is expedient to keep the concentration of the calcium arsenate suspension as high as possible. In this case the paste must be watched very closely from the time the swelling starts to avoid excess of water and to prevent the mix from becoming so thick that it may cause the agitator to stick.

To the extent that the function of the water added during the swelling stage is merely that of enlarging the mass of material through which the arsenate material is distributed, the addition of water may be dispensed with entirely wherever the advantage of the greater resultant distribution of the arsenate particles is not commensurate with the trouble and expense of the necessary subsequent evaporation or removal of the added water. For many commercial purposes, therefore, no addition of diluting water is necessary after the pasty condition of the material has been reached, but the boiling of the pasty mass may be commenced as soon as the original precipitate has formed a thick paste in the original liquid. This method of operation is particularly advantageous when filtration is not contemplated prior to the final drying step.

The heating must be such as to raise the temperature of the mix to the boiling point and it should be kept at this point for fully twenty minutes to insure proper removal of the water of hydration in the product resulting from the swelling operation. I do not wish to restrict myself to the particular time periods mentioned, and it is probable that the time of boiling will have to be varied with the amount of calcium arsenate to be dehydrated. In practice I have found that twenty minutes boiling should be the minimum for batches of 1000 pounds (dry calcium arsenate). If the boiling is continued for too short a time the calcium arsenate will be relieved only of the water of hydration at the surface of the crystals without becoming dehydrated to the extent necessary to break down the needle-like crystalline structure to yield the desired uniform small rounded particles. This feature is of importance for the proper control of the percentage of arsenic in the final product and unless this dehydration is reached during the boiling step an uncertain $As_2O_5$ content will result in the product depending upon the extent of the original hydration.

It will be noted that in the process described above there are three important distinct phases. First, what I will term the pre-swelling phase. During this phase, although the arsenic acid has been added and is neutralized, so far as chemical tests show, by the lime, the slurry remains thin and a microscopic examination shows no uniformity of the crystal forms. It is probable that during this pre-swelling phase there is present a mixture of the di- and tri-calcuium arsenate, and possibly mono-calcium arsenate, with perhaps some free undissolved calcium hydroxide. The intermediate product resulting from this pre-swelling stage or phase if attempted to be used as a final commercial product would, however, not be very satisfactory, because great difficulty would be encountered in endeavoring to control the total $As_2O_5$ content of the final product, and moreover, the soluble arsenic content would vary widely.

Second, the swelling phase. During this the peculiar phenomenon described above takes place and I believe that the action is due to the fact that during this phase the mixtures of calcium arsenate obtained in the first phase arrive at a balance among one another and with the free hydrated lime as it gradually goes more and more into solution, it being necessary for the hydrated lime to become dissolved before it can react with the weakly acid compounds represented by the arsenate obtained in the first phase, and it is my belief that this swelling phase results finally in the formation of a definite compound of uniform composition, probably a highly hydrated basic calcium arsenate of the approximate formula $$Ca_3(AsO_4)_2 \cdot xCa(OH)_2 \cdot yH_2O,$$

where $x$ is approximately 2 and $y$ is unknown but approximately 3, the number being greater than 2 and less than 4. My belief that a new compound of calcium arsenate is definitely formed during this second phase of the process is confirmed by the uniform needle-like shape of the individual crystals accompanied by the swelling as the product takes on more water.

The swelling phenomenon to which reference has been made should be distinguished from the ordinary thickening which is likely to occur as the reaction between arsenic acid and lime progresses, no matter what mode of effecting the reaction is adopted. Regardless of the temperature of the reaction, there is a certain amount of thickening in any case, and that thickening under certain conditions becomes quite marked. Unless the procedure of this specification is followed, however, such thickening would have no bearing on the formation of a product of uniform physical and chemical characteristics, but results in a product of irregular crystal form and of doubtful chemical analysis. The swelling referred to in this specification, on the other hand, being caused by the calcium arsenate absorbing large quantities of water and marking the transformation of the calcium arsenate from a mixture of varying formula to crystals of uniform chemical composition, is quite dissimilar from the thickening heretofore experienced, and should not be confused therewith.

Third, the preliminary de-hydration phase. In this phase, the water of crystallization is reduced by boiling to approximately one molecule and the precipitate is changed from the needle-like crystal form to small, uniform, rounded particles apparently non-crystalline. At this stage also, the arsenic content is finally fixed as to the amount that will be obtained on drying, in accordance with the usual commercial practice.

As heretofore pointed out, the concentration or dilution of the lime suspension and the resulting precipitate determines to a large extent the period of time required for the swelling operation to begin or to become complete. Other factors being equal, the lower the concentration, the longer is the period. For this reason I prefer that the lime suspension should usually be about 10–15% by weight of CaO. When employing concentrations near the upper limit, i. e., 15% CaO, the swelling will begin fairly promptly upon the addition of the arsenic acid.

The calcium arsenate product which results from the treatment described above has a very marked physical superiority over calcium arsenate manufactured by other processes, particularly those which employ precipitation at temperatures above 100° F., in which case the average crystal size is always larger than obtained by my process, sometimes as much as thirty times as great. Another important characteristic of my improved product is its remarkable uniformity especially as regards the amount of soluble arsenic present in the finished product. It was found by actual test that only a small proportion of pastes produced according to my invention showed any soluble arsenic and even those that contained soluble arsenic exhibited only a small percentage of it. My invention therefore enables the manufacturer to supply a product of great efficiency and of uniform or standard characteristics, so that the user will always be able to get the same results from the same amount or weight of the product and will therefore be relieved of the necessity of carrying out tedious experiments which are unavoidable with the present calcium arsenate product on account of their uncertain and varying composition and efficiency.

In the specific example described in detail, a suspension of hydrated lime is first prepared and arsenic acid is then run into this suspension. The order of this procedure may be varied. Thus the lime may be added to the arsenic acid or the lime may be added to part of the arsenic acid and the balance of the required arsenic acid be added to the resulting slurry. Numerous other variations and modifications of detail may obviously be made without departing from the scope and spirit of this invention.

I claim:

1. The process which consists in causing precipitated calcium arsenate material to become converted into the form of a swelling paste-like mass and then treating said paste-like mass for the recovery therefrom of small, uniform, rounded, solid particles of product.

2. The process which consists in reacting, at a temperature below 100° F., arsenic acid with a suspension of hydrated lime containing approximately 15% CaO by weight, agitating the mix of precipitated calcium arsenate with the liquor until the mix thickens to a heavy paste, adding water to said paste to preserve the pasty condition and to form a uniform hydrated basic calcium arsenate, boiling the hydrated product to at least partially dehydrate the same and drying the resulting product after partial dehydration.

3. The process which consists in reacting, at a temperature below 100° F., arsenic acid with a suspension of hydrated lime containing from 5–15% CaO by weight, agitating the mix of precipitated calcium arsenate with the liquor until the mix thickens to a heavy paste, adding water to said mix to preserve the pasty condition and to produce a uniform hydrated basic calcium arsenate, and boiling the hydrated product to at least partially dehydrate the same and to change the needle-like crystals to minute uniform rounded particles.

4. The process which consists in reacting, at a temperature below 100° F., arsenic acid with a suspension of hydrated lime containing from 5-15% CaO by weight, agitating the precipitated calcium arsenate with the liquor until the mix thickens to a heavy paste, and boiling the paste thus formed to at least partially dehydrate the hydrated basic calcium arsenate, and drying the resulting product.

5. The process which consists in reacting, at low temperatures, arsenic acid with a suspension of hydrated lime containing from 5-15% CaO by weight, agitating the precipitated calcium arsenate with the liquor until the mix thickens to a heavy paste, adding water to said mix to preserve the pasty condition and to produce a uniform hydrated basic calcium arsenate and heating the hydrated product to at least partially dehydrate the same, and to produce tri-calcium arsenate in the form of minute rounded particles.

6. The process which consists in reacting, at low temperatures, arsenic acid with a suspension of hydrated lime, agitating the precipitated calcium arsenate and liquor until the mass thickens to a heavy paste whereby a hydrated basic calcium arsenate is formed, and boiling the hydrated product to at least partially dehydrate the same to produce tri-calcium arsenate in the form of uniform rounded particles.

7. The process which consists in producing calcium arsenate in the form of a paste composed of needle-like crystals of hydrated basic calcium arsenate of the composition $Ca_3(AsO_4)_2Ca(OH)_2.yH_2O$, where $y$ is approximately 3, and subsequently heating the pasty mass to cause at least partial dehydration whereby tri-calcium arsenate in the form of small rounded particles is produced.

8. The process which consists in reacting, at low temperatures, arsenic acid with a suspension of lime containing 5-15% CaO by weight, causing the precipitate to thicken to a paste, and subsequently heating said pasty mass to produce calcium arsenate in the form of uniform rounded particles.

9. Arsenate of lime consisting of uniform rounded particles such as may be prepared by the herein described process which comprises reacting a lime suspension with arsenic acid under low temperature conditions, causing the precipitated mixture to thicken to a pasty state to form uniform crystals of hydrated basic calcium arsenate, boiling the pasty mass to cause at least partial dehydration of such crystals, and drying.

In testimony whereof I have hereunto set my hand.

WILLIAM J. LIIPFERT.